United States Patent
Ahn

(10) Patent No.: US 8,808,922 B2
(45) Date of Patent: Aug. 19, 2014

(54) ELECTRODE ASSEMBLY AND SECONDARY BATTERY USING THE SAME

(75) Inventor: Chang-Bum Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 749 days.

(21) Appl. No.: 12/973,716

(22) Filed: Dec. 20, 2010

(65) Prior Publication Data

US 2011/0274960 A1  Nov. 10, 2011

(30) Foreign Application Priority Data

May 4, 2010 (KR) .................. 10-2010-0041836

(51) Int. Cl.
*H01M 2/16* (2006.01)
*H01M 6/46* (2006.01)
*H01M 6/12* (2006.01)
*H01M 2/02* (2006.01)
*H01M 2/08* (2006.01)

(52) U.S. Cl.
USPC ........... 429/246; 429/152; 429/162; 429/178; 429/181; 429/185

(58) Field of Classification Search
USPC .................. 429/246, 152, 162, 178, 181, 185
See application file for complete search history.

(56) References Cited

U.S. PATENT DOCUMENTS 6,287,721 B1 * 9/2001 Xie et al. ...................... 429/152
7,887,955 B2 * 2/2011 Saruwatari et al. ........... 429/246
8,426,069 B2 * 4/2013 Okazaki et al. ............... 429/246
2007/0105014 A1 * 5/2007 Shin et al. ..................... 429/152
2010/0255368 A1 10/2010 Park et al.

FOREIGN PATENT DOCUMENTS

| KR | 10-2007-0049256 | 5/2007 |
| KR | 10-2008-0036250 | 4/2008 |
| KR | 10-2009-0065587 | 6/2009 |

OTHER PUBLICATIONS

English Translation of KIPO Office action dated May 1, 2012 in corresponding application KR 10-2010-0041836, 1 page (previously cited on May 21, 2013).

* cited by examiner

*Primary Examiner* — Patrick Ryan
*Assistant Examiner* — Julian Anthony
(74) *Attorney, Agent, or Firm* — Christie, Parker & Hale, LLP

(57) ABSTRACT

An electrode assembly and a secondary battery using the same. In an embodiment, the electrode assembly includes one or more first electrodes each having a first tab provided to one surface thereof, and one or more second electrodes each having a second tab provided to one surface thereof. The second electrodes are alternately stacked with the first electrodes. A separator is interposed between the first and second electrodes and folded a plurality of times so that the same surfaces of the separator face each other. The separator has one or more tab through-holes through which the first and second tabs protrude at folded portions of the separator.

17 Claims, 6 Drawing Sheets

ELECTRODE ASSEMBLY AND SECONDARY BATTERY USING THE SAME

CROSS-REFERENCE TO RELATED APPLICATION

This application claims the benefit of Korean Application No. 10-2010-0041836, filed May 4, 2010 in the Korean Intellectual Property Office, the disclosure of which is incorporated herein by reference.

BACKGROUND

1. Field

Aspects of the present invention relate to a stacking type electrode assembly and a secondary battery using the same. More particularly, aspects of the present invention relate to a secondary battery and an electrode assembly therein where the electrode assembly has a structure in which a plurality of positive and negative electrode plates are stacked in a separator folded at a certain interval. The secondary battery has an enhanced stability without a danger such as a short circuit or fire even when the separator contracts due to a high temperature or the like.

2. Description of the Related Art

Secondary batteries are batteries that can be repeatedly recharged, and are generally used as power sources of mobile devices. A secondary battery includes an outer casing and an electrode assembly accommodated in the interior of the outer casing. The secondary battery is classified into a pouch type secondary battery, a prismatic type secondary battery and a cylinder type secondary battery depending on the kind of outer casing used. Also, the electrode assembly accommodated in the interior of the outer casing is classified into a winding-type electrode assembly, a stacking-type electrode assembly and the like.

The winding-type electrode assembly is formed by winding long sheet-shaped positive and negative electrode plates and a separator interposed therebetween. The stacking-type electrode assembly is formed by sequentially stacking positive and negative electrodes with a certain size while interposing separators therebetween.

In a secondary battery using a winding-type electrode assembly in a prismatic type or pouch type outer casing, chemical reactions do not take place uniformly between electrode plates. Therefore, electrode active materials may separate from the electrode plates, the electrode assembly may expand, or the like. On the other hand, since chemical reactions do take place uniformly in a stacking-type electrode assembly, the lifespan of the secondary battery is extended. However, it is difficult to exactly align positive and negative electrode plates with a separator, and a short circuit may be caused when the separator contracts due to a high temperature or the like.

SUMMARY

Embodiments of the present invention provide an electrode assembly, as well as a secondary battery using the electrode assembly, in which it is easy to align a positive electrode plate, a separator and a negative electrode plate, and there is little danger such as a short circuit or fire even when the separator contracts due to a high temperature or the like.

Aspects of the present invention provide an electrode assembly including: one or more first electrodes, each having a first tab provided to one surface thereof; one or more second electrodes, each having a second tab provided to one surface thereof, the second electrodes being alternately stacked with the first electrodes; and a separator interposed between the first and second electrodes and folded a plurality of times so that the same surfaces of the separator face each other, the separator having one or more tab through-holes through which the first or second tab protrudes at a folded portion of the separator.

The first electrode may further include a positive electrode collecting plate and a positive electrode active material layer. The second electrode may further include a negative electrode collecting plate and a negative electrode active material layer.

Two folds of the separator may be interposed between the first and second electrodes.

The separator may surround the tab regions and upper and lower surfaces of the first and second electrodes.

The tab through-holes may be arranged in a zigzag form.

The first and second tabs may be extended to the exterior of the separator through the tab through-holes, respectively. The first and second tabs extended to the exterior may be spaced apart from each other in a horizontal direction.

The tab through-hole may include an elliptical hole. The tab through-hole may be formed using a thermal fusion method.

The length of the tab through-hole may be longer by about 1.0 to about 2.0 mm than the width of each of the first and second tabs.

The separator may be composed of one or more of polyethylene, polypropylene and polyvinylidene fluoride.

When the portion having the second tab of the second electrode is an upper portion, the separator is folded at an interval longer by about 4.0 mm than the longitudinal length of the second electrode.

Aspects of the present invention provide a secondary battery including: an electrode assembly including one or more first electrodes, each having a first tab provided to one surface thereof; one or more second electrodes, each having a second tab provided to one surface thereof, the second electrodes being alternately stacked with the first electrodes; a separator interposed between the first and second electrodes and folded a plurality of times so that the same surfaces of the separator face each other, the separator having one or more tab through-holes through which the first or second tab protrudes at a folded portion thereof; and an outer casing having the electrode assembly built therein.

The outer casing may include a pouch type or can type outer casing. The pouch type outer casing may be made of a laminate sheet including a metal layer and a resin layer. The pouch type outer casing may further include a sealing portion. The sealing portion may be formed along an outer circumferential surface of the pouch type outer casing, and the pouch type outer casing may be sealed by thermally fusing the sealing portion.

An electrode assembly according to aspects of the present invention employs a separator having tab through-holes. Since the positions of first and second electrodes can be easily determined by first and second tabs that respectively pass through the tab through-holes, electrode plates can be easily and precisely aligned. In the process of manufacturing the related art stacking-type electrode assembly, the process of aligning the electrode plates and the electrode assembly can be omitted, thereby reducing manufacturing cost and increasing manufacturing efficiency.

In a secondary battery using the electrode assembly according to aspects of the present invention, the electrode assembly with first and second electrodes having a certain size are alternately stacked with the separator interposed therebetween so the first and second electrodes do not come in direct contact with each other. Therefore, since the first and second electrodes are not exposed even when the separator contracts due to a high temperature or the like, there is no danger such as a short circuit or fire. Accordingly, the stability of the battery can be enhanced.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
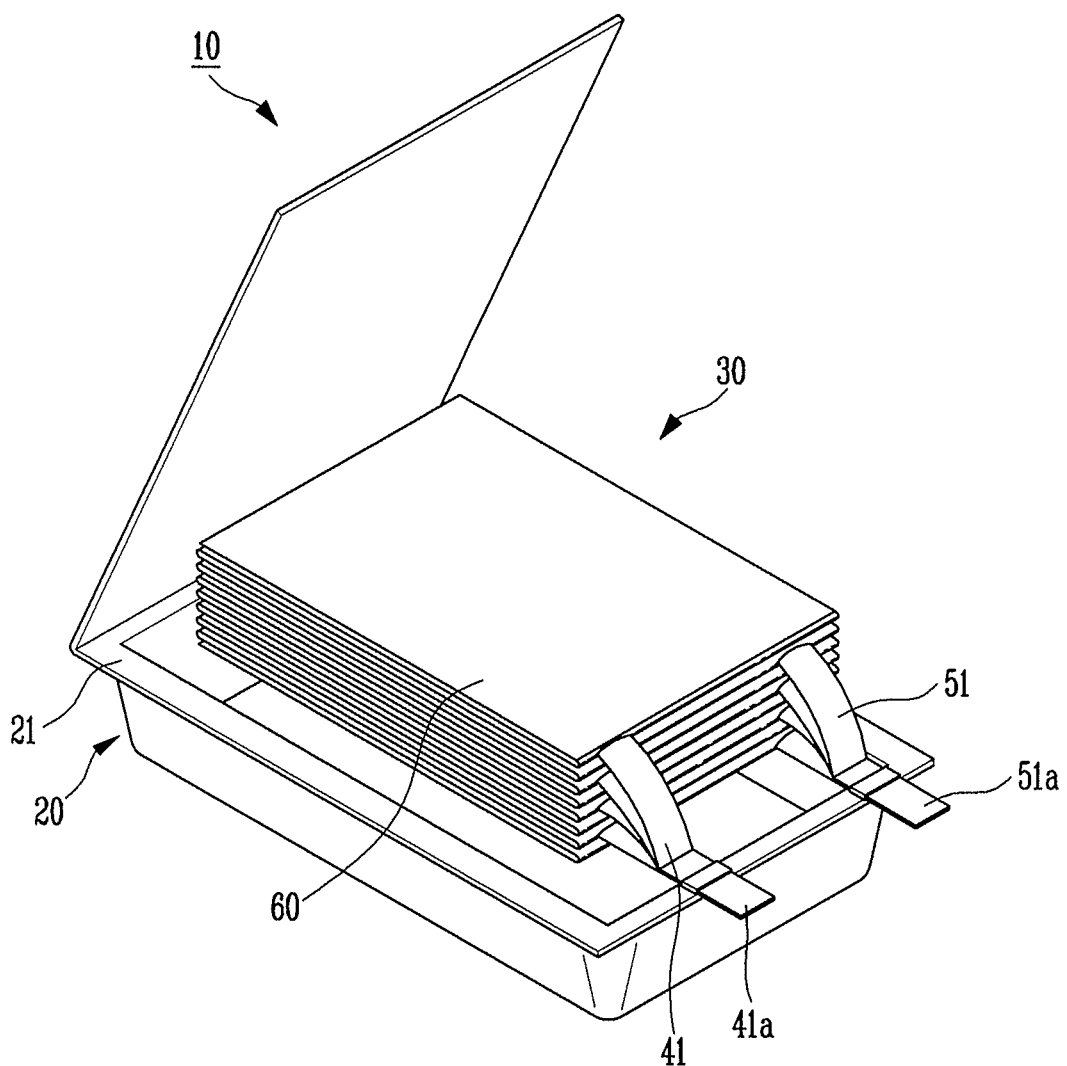
FIG. 1 is a perspective view of a secondary battery having a stacking-type electrode assembly built therein according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween.

Figure 2A:
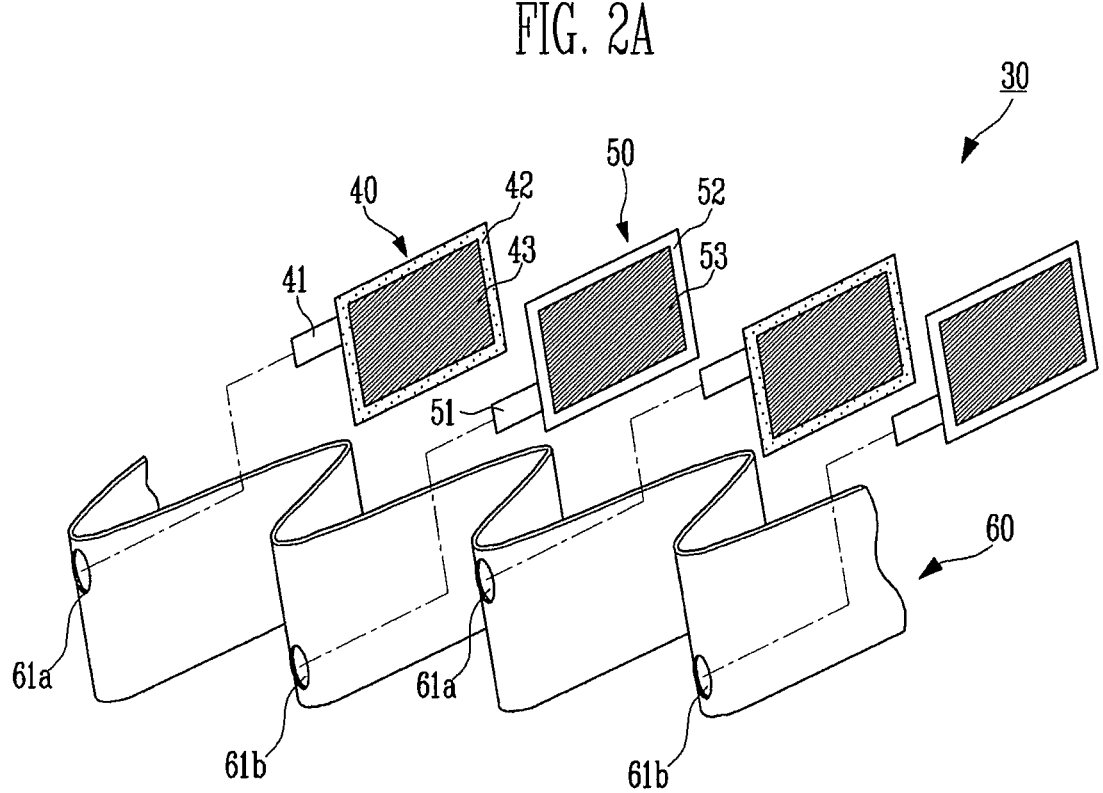
FIG. 2A is an exploded perspective view of the stacking-type electrode assembly according to the embodiment of FIG. 1.
Figure 2B:
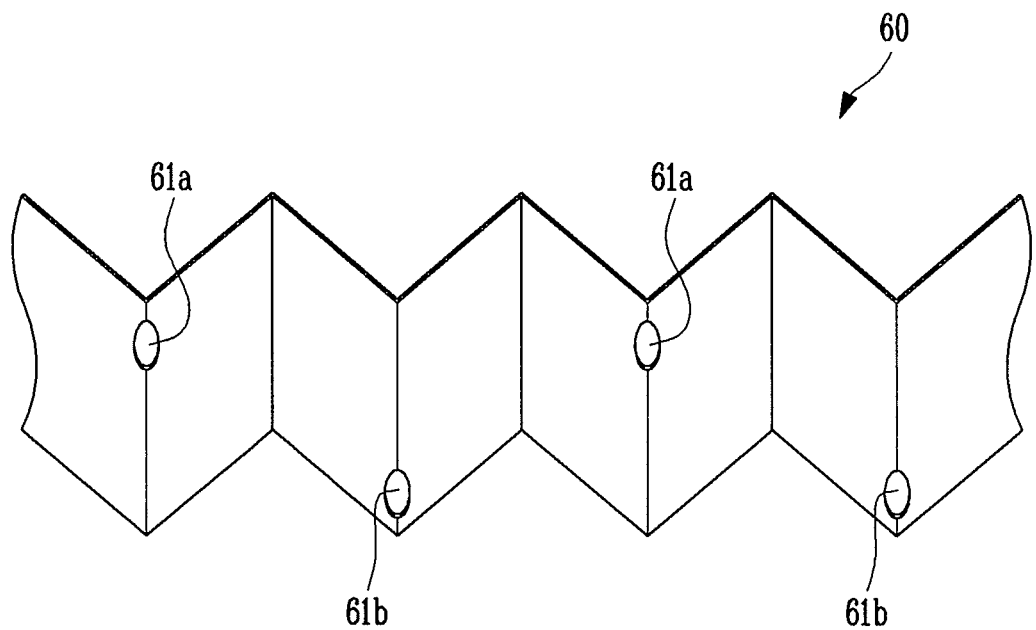
FIG. 2B is a perspective view of the separator according to the embodiment of FIG. 1.

FIGS. 1 to 2B are views showing a secondary battery according to an embodiment of the present invention. FIG. 1 is a perspective view of the pouch type secondary battery having a stacking-type electrode assembly built therein. FIG. 2A is an exploded perspective view of the stacking-type electrode assembly according to the embodiment of FIG. 1. FIG. 2B is a perspective view of a separator according to the embodiment of FIG. 1.

Referring to FIG. 1, the secondary battery 10 according to this embodiment of the present invention includes an outer casing 20 and a stacking-type electrode assembly 30. The electrode assembly 30 has first and second electrodes (not shown) and a separator 60 interposed therebetween. Hereinafter, for convenience of illustration, the first and second electrodes are referred to as positive and negative electrode plates, respectively.

Referring to FIGS. 2A and 2B, the electrode assembly 30 according to this embodiment includes one or more positive electrode plates 40 each having a first tab 41 formed at one surface thereof; one or more negative electrode plates 50 each having a second tab 51 formed at one surface thereof, and alternately stacked with the positive electrode plates 40; a separator 60 interposed between the positive and negative electrode plates 40 and 50, and having one or more tab through-holes 61a and 61b through which the first and second tabs 41 and 51 protrude at portions folded a plurality of times so that surfaces folded opposite to each other are part of the same surface.

The positive electrode plate 40 may include a first tab 41, a positive electrode collecting plate 42 and a positive electrode active material layer 43. The positive electrode collecting plate 42 is made of a high conductive material. The material of the positive electrode collecting plate 42 is not particularly limited so long as it does not cause a chemical change. For example, the positive electrode collecting plate 42 may be made of aluminum, nickel, titanium, plastic, carbon, or the like. The positive electrode plate 40 also has the positive electrode active material layer 43 coated with a positive electrode active material or the like, and a positive electrode non-coating portion on which the positive electrode active material is not coated. The positive electrode active material layer 43 may further include a positive electrode active material, a binder used to attach the active material to the positive electrode collecting plate 42, and a conductive agent. The positive electrode active material layer 43 is formed by adding the positive electrode active material, the binder and the conductive agent into a solvent to be a slurry and then coating the slurry on the positive electrode collecting plate 42. N-methyl-2-pyrrolidone (NMP) may be used as the solvent, and lithium cobalt oxide ($LiCoO_2$) may be used as the positive electrode active material. Acetylene black, carbon black or graphite may be used as the conductive agent, and polyvinylidene fluoride may be used as the binder. However, the present invention is not limited thereto.

The first tab 41 may be formed of nickel or the like. The first tab 41 is attached to an upper surface of the positive electrode non-coating portion by using any one of ultrasonic welding, resistance welding and laser welding.

The negative electrode plate 50 may include a second tab 51, a negative electrode collecting plate 52 and a negative electrode active material layer 53. The negative electrode plate 50 has the negative electrode active material layer 53 formed by coating a negative electrode active material on the negative electrode collecting plate 52, and a negative electrode non-coating portion on which the negative electrode active material is not coated. The negative electrode collecting plate 52 has a conductive property, and may be formed, for example, of copper, stainless steel, aluminum, nickel or the like. The negative electrode active material layer 53 is made of a negative electrode active material, and may include, for example, graphite-based carbon, and the like.

The second tab 51 is attached to an upper surface of the negative electrode non-coating portion by using any one of ultrasonic welding, resistance welding and laser welding. The second tab 51 may be formed of nickel or the like. The first and second tabs 41 and 51 may extend to the exterior of the separator 60 through the tab through-holes 61a and 61b, respectively. The first and second tabs 41 and 51 may be spaced apart from each other in a horizontal direction.

The separator 60 has one or more tab through-holes 61*a* and 61*b* in the interior thereof, and may be formed in the shape of a long, extended sheet. The separator 60 serves as a path for ions and prevents the positive and negative electrode plates 40 and 50 from coming in direct contact with each other. Therefore, an insulating thin film with high ion transmittance and mechanical strength may be used as the separator 60. For example, the separator 60 may include a porous film, an unwoven fabric or the like.

Referring to FIG. 2B, the separator 60 according to this embodiment is folded a plurality of times so that surfaces folded opposite to each other are part of the same surface. The separator 60 includes one or more tab through-holes 61*a* and 61*b* through which the first and second tabs 41 and 51, respectively, protrude at folded portions. Generally, the separator 60 may be folded at constant intervals. The first and second tabs 41 and 51 may extend to the exterior of the separator 60 through the tab through-holes, respectively.

The tab through-holes 61*a* and 61*b* may have various sizes and shapes so long as the positive and negative electrode active material layers 43 and 53 of the positive and negative electrode plates 40 and 50 are not exposed. The tab through-holes 61*a* and 61*b* may be alternatively formed at both horizontal ends of the folded portions, so that they are arranged in a zigzag form. The size of each of the tab through-holes 61*a* and 61*b* may be determined by the size of the tabs 41 and 42 that pass therethrough, and the shape of the tab through-holes 61*a* and 61*b* may be elliptical holes.

The tab through-holes 61*a* and 61*b* may be formed using various methods depending on the material constituting the separator 60 or the shape and size of the tab through-holes 61*a* and 61*b*. For example, each of the tab through-holes 61*a* and 61*b* may be formed at a predetermined position of the separator 60 using a punching mold with a shape similar to that of the desired tab through-holes 61*a* and 61*b*. The tab through-holes 61*a* and 61*b* may be formed by a thermal fusion method using an iron tip or the like.

Figure 3:
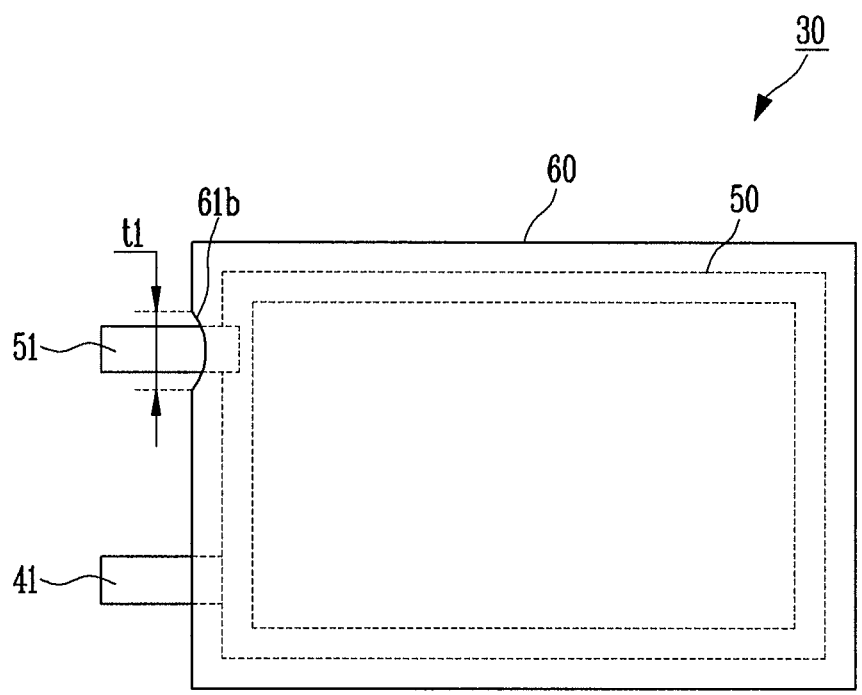
FIG. 3 is a front perspective view of the stacking-type electrode assembly according to the embodiment of FIG. 1.

FIG. 3 is a front perspective view of the stacking-type electrode assembly according to the embodiment of FIG. 1. When the shape of the tab through hole 61*b* is an elliptical hole, the length of the major axis of the tab through-hole 61*b* may be appropriately modified depending on the width of the second tab 51 that passes through the hole. The length (not shown) of the tab through-hole through which the first tab 41 passes and the length t1 of the tab through-hole 61*b* through which the second tab 51 passes may be determined by the width of tabs used based on the design of the secondary battery 10.

In this embodiment, the first and second tabs 41 and 51 are designed of equal dimensions. Referring to FIG. 3, the length t1 of the major axis of the tab through-hole 61*b* may be formed longer by about 1.0 mm than the width of the second tab 51. Preferably, the length t1 of the major axis of the tab through-hole 61*b* may be formed longer by about 1.0 to about 2.0 mm than the width of the second tab 51. When the length t1 of the major axis of the tab through-hole 61*b* is formed longer by less than 1.0 mm than the width of the second tab 51, the tab through-hole 61*b* may be damaged by the tab that passes therethrough. When the length t1 of the major axis of the tab through-hole 61*b* is formed longer by more than 2.0 mm than the width of the second tab 51, the position of the negative electrode plate 50 connected to the second tab 51 will not be fixed but may move. Therefore, when electrode plates are stacked, it is not easy to align the electrode plates and a failure may be caused in the manufacturing process.

These dimension issues may be equally applied to the tab through-hole 61*a* (not shown in FIG. 3) through which the first tab 41 passes.

Generally, the size of the separator 60 used in the secondary battery 10 is larger than that of the negative electrode plate 50. That is, the length between folds of the separator 60 is greater than the length of the negative electrode plate 50 and the width of the separator 60 is wider than the width of the negative electrode plate 50. This is because the stability of the secondary battery 10 is considered in the design of the folds. When the size of the separator 60 is smaller than that of the negative electrode plate 50, the negative electrode plate 50 and the positive electrode plate 40 (not shown in FIG. 3) may come in direct contact with each other, and therefore, a short circuit or the like may occur. Accordingly, the size of the separator 60 is designed so as to ensure stability and have the smallest feasible margin.

In FIG. 3, the separator 60 is shown larger than the negative electrode plate 50. In this embodiment, the separator 60 surrounds upper and lower surfaces of the negative electrode plate 50 in the area where the second tab 51 is formed. For this reason, a risk of a short circuit between the first tabs, caused in the manufacturing process, or the like can be reduced as compared with the related art stacking-type electrode assembly. The dimension issues in these two paragraphs related to the separator 60 may be equally applied to the positive electrode plate 40 as well.

Figure 4:
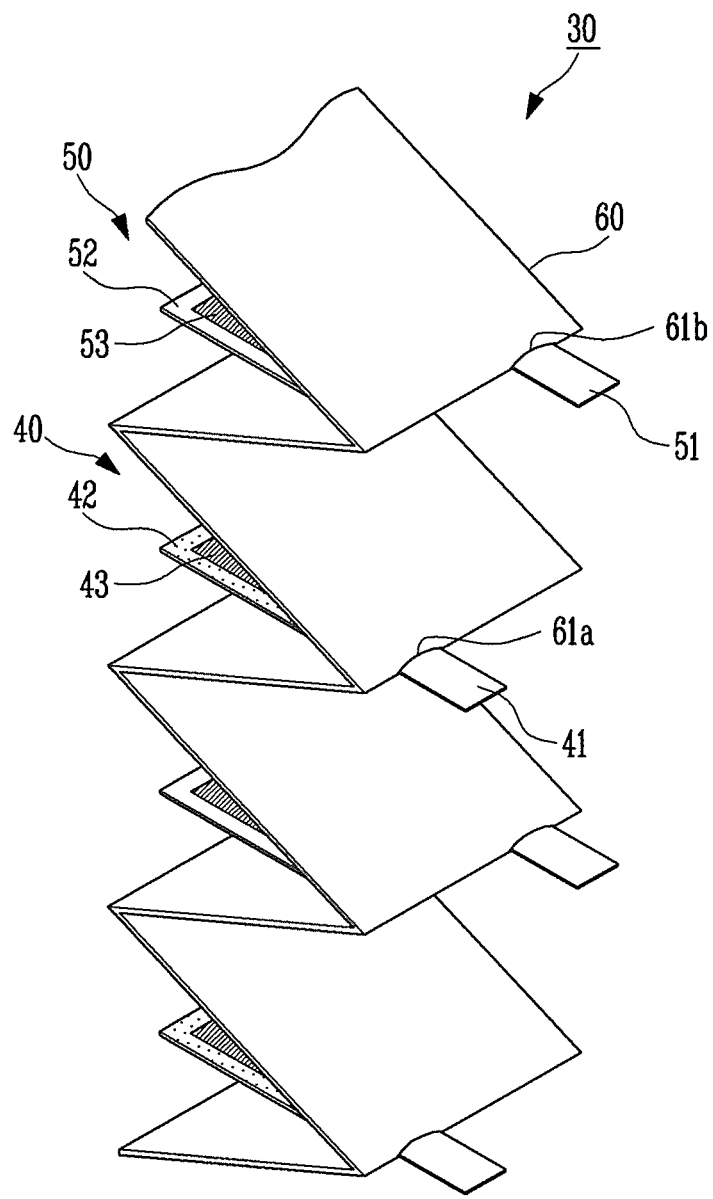
FIG. 4 is an exploded perspective view of the stacking-type electrode assembly according to an embodiment of the present invention.

FIG. 4 is an exploded perspective view of a stacking-type electrode assembly according to an embodiment of the present invention. Referring to FIG. 4, the electrode assembly 30 according to this embodiment includes a separator 60 in which the aforementioned tab through-holes 61*a* and 61*b* are formed, and one or more positive and negative electrode plates 40 and 50 with a certain size.

The extended sheet-shaped separator 60 may be folded at constant intervals. However, as illustrated in FIG. 4, the interval may not be constant, and is determined by the size of the stacked electrode plates, particularly the negative electrodes 50. In the design of the secondary battery 10, the sizes of the positive and negative electrode plates 40 and 50, and the like are determined based on the size and capacity of the particular secondary battery 10. Generally, within any one secondary battery, as illustrated in FIG. 4, the negative electrode plate 50 is larger than the positive electrode plate 40, and the separator 60 interposed between the electrode plates is designed to be larger than the negative electrode plate 50. Preferably, when the portion having the second tab 51 of the negative electrode plate 50 is an upper portion, the longitudinal length of the separator 60 is formed longer by about 0.5 to 6.0 mm than that of the negative electrode plate 50. Most preferably, the upper and lower portions of the separator 60 have margins of about 2.0 mm with respect to those of the negative electrode plate 50, respectively.

As described above, the upper surfaces of the separator 60 folded at the constant interval face each other, and the lower surfaces of the separator 60 face each other. That is, the same surfaces face each other. Thus, the tab through-holes 61*a* and 61*b* are alternately formed at both horizontal ends of the folded portions, so that they are arranged in a zigzag form.

In the separator 60 folded at the constant interval as described above, the same surfaces of the separator 60 face each other, and the positive and negative electrode plates 40 and 50 are alternately stacked between the same surfaces of the separator 60. More specifically, the positive and negative electrode plates 40 and 50 are alternately inserted into the separator 60 in the same direction so that the first and second tabs 41 and 51 provided to the positive and negative electrode plates 40 and 50 pass through the tab through-holes 61a and 61b formed to be arranged in the zigzag form at the folded portions of the separator 60, respectively. Thus, the folded portions of the separator 60 surround the tab regions and upper and lower surfaces of the positive and negative electrode plates 40 and 50. Since each of the electrode plates is stacked between a plurality of folds of the separator 60, preferably two folds of the separator 60, the electrode plates 40 and 50 do not directly face or contact each other.

The first and second tabs 41 and 51 are provided to the positive and negative electrodes 40 and 50 at predetermined positions of the positive and negative electrodes 40 and 50, respectively, and the tab through-holes 61a and 61b are also arranged at predetermined positions in the separator 60. Thus, the electrode plates, the separator 60 and the first and second tabs 41 and 51 can be constantly aligned without an additional process or the like just by stacking the electrode plates as described above.

Accordingly, portions of the first and second tabs 41 and 51 extend to the exterior of the separator 60 and are spaced apart in parallel with each other. In FIG. 4, it has been shown that the second and first tabs 51 and 41 pass through right (61b) and left (61a) tab through-holes, respectively. However, the present invention is not limited thereto but may be appropriately modified based on the design of the battery, including the positions and sizes of the tabs, and the like.

Figure 5A:
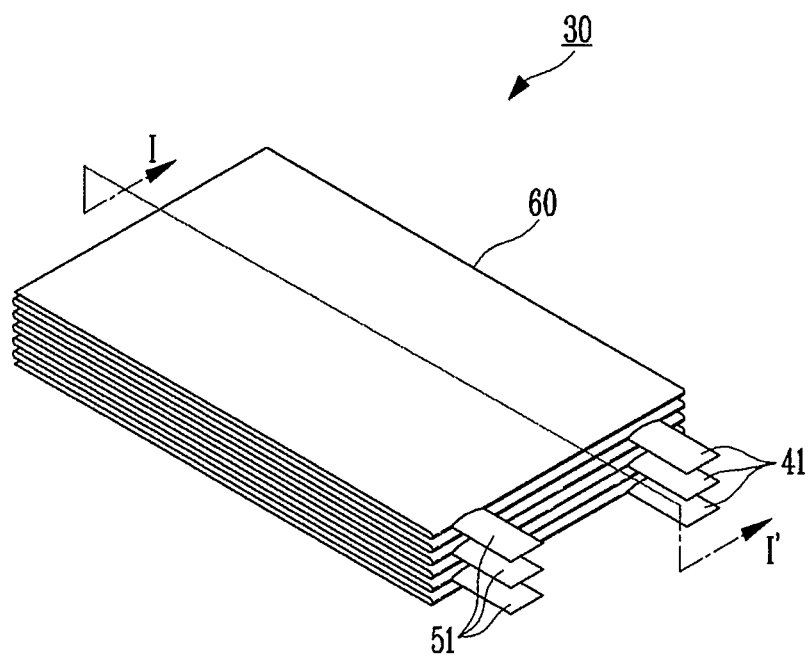
FIG. 5A is a perspective view of the stacking-type electrode assembly according to an embodiment of the present invention.
Figure 5B:
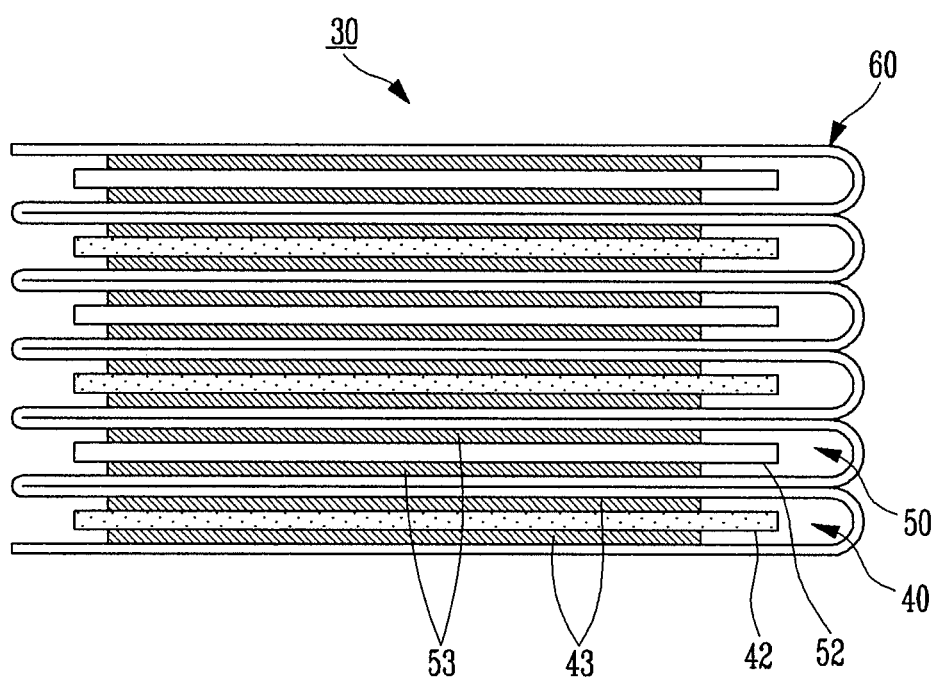
FIG. 5B is a sectional view of the stacking-type electrode assembly taken along line I-I' of FIG. 5A.

FIG. 5A is a perspective view of the stacking-type electrode assembly 30 according to an embodiment of the present invention. FIG. 5B is a sectional view of the stacking-type electrode assembly 30 taken along line I-I' of FIG. 5A.

Referring to FIGS. 5A and 5B, the positive and negative electrode plates 40 and 50 are inserted into the separator 60 folded at a constant interval. The electrode plates are alternately stacked to face the same surfaces of the separator 60. Therefore, since the same surfaces that belong to only one surface of the separator 60 alternately come into contact with the electrode plates, two or more folds of the separator 60, preferably two folds of the separator 60, may be stacked between the positive and negative electrode plates 40 and 50.

The tab through-holes 61a and 61b arranged in the zigzag form at the predetermined positions are respectively provided to the folded portions of the separator 60, and the first and second tabs 41 and 51 respectively extended through the tab through-holes 61a and 61b are also arranged in the zigzag form at the predetermined positions, so that the same kind of tabs are aligned. As such, the same kind of aligned tabs are formed in a weld metal zone by joining the arranged tabs together into a single body using a method such as welding, and the weld metal zone is connected to one electrode lead. The electrode plates stacked as described above are electrically connected to the exterior of the battery by the electrode leads 41a and 41b (see FIG. 1). Referring to FIG. 5B, the positive electrode active material layer 43 formed in the positive electrode plate 40 is opposite to the negative electrode active material layer 53 formed in the negative electrode plate 50 with the separator 60 interposed therebetween, and such a structure is repeatedly stacked, thereby forming the stacking-type electrode assembly 30.

As described above, the electrode assembly 30 according to this embodiment of the present invention employs the separator 60 having the tab through-holes 61a and 61b formed therein, and has a structure stacked by respectively passing the tabs 41 and 51 provided to the positive and negative electrode plates 40 and 50 through the tab through-holes. Accordingly, the electrode assembly according to this embodiment of the present invention is advantageous in that the positive and negative electrode plates 40 and 50 can be easily aligned, and it is safe even when the separator 60 contracts due to a high temperature or the like.

Hereinafter, a secondary battery 10 including a stacking-type electrode assembly 30 according to the embodiment of FIG. 1 will be described with reference to FIGS. 1 and 6. In order to clarify the description of the secondary battery 10 according to this embodiment of the present invention, descriptions overlapping with the aforementioned embodiment will be omitted or briefed.

Figure 6:
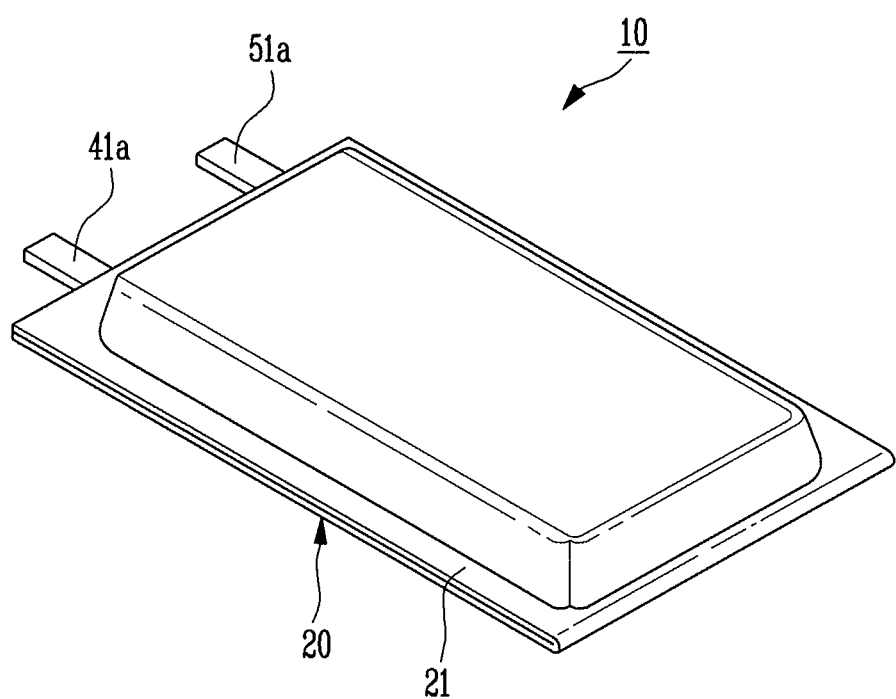
FIG. 6 is a perspective view of a secondary battery according to the embodiment of FIG. 1.

FIGS. 1 and 6 relate to a secondary battery 10 according to this embodiment of the present invention. FIG. 1 is an exploded perspective view of the secondary battery 10. FIG. 6 is a perspective view of the secondary battery 10.

Referring to FIGS. 1 and 6, the secondary battery 10 according to this embodiment includes an electrode assembly 30 and an outer casing 20 having the electrode assembly 30 built therein. The electrode assembly 30 is manufactured according to the aforementioned method. The electrode assembly 30 is inserted into the outer casing 20, thereby manufacturing the secondary battery 10.

The outer casing 20 may include a pouch type outer casing and a can type outer casing. The outer casing 20 is preferably a pouch type outer casing. FIGS. 1 and 6 illustrate a pouch type outer casing.

In the electrode assembly 30, first or second tabs 41 or 51 are formed in a weld metal zone by joining them together in a single body using a method such as welding. The weld metal zones formed by the first and second tabs 41 and 51 are connected to first and second electrode leads 41a and 51a. Therefore, the first and second electrode leads 41a and 51a allow the electrode assembly 30 to be electrically connected to the exterior of the secondary battery. The electrode assembly 30 having the first and second electrode leads 41a and 51a connected thereto is inserted into the pouch type outer casing 20, and an electrolyte is injected into the pouch type outer casing 20. Then, a sealing portion 21 is fused and sealed.

The pouch type outer casing 20 may be made of a laminate sheet including, for example, a metal layer and a resin layer. Preferably, the pouch type outer casing 20 is made of an aluminum laminate sheet, and an accommodating portion having the electrode assembly 30 mounted therein is formed in the interior of the pouch type outer casing 20.

The sealing portion 21 is formed along an outer circumferential surface of the pouch type outer casing 20, and the pouch type outer casing 20 is sealed by thermally fusing the sealing portion 21, or the like. An insulating film may be attached to portions of the upper and lower surfaces of the first and second electrode leads 41a and 51a so as to increase the sealing degree with the pouch type outer casing 20 at the portions that come in contact with the sealing portion 21 and to ensure adequate electrical insulation. Accordingly, the secondary battery 10 shown in FIG. 6 can be manufactured.

In this embodiment, the secondary battery 10 is manufactured using a pouch type outer casing, but this embodiment is provided only for illustrative purposes. That is, the secondary battery may be applied to various types of outer casings including a can type outer casing and the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly comprising:
   one or more first electrodes, each having a first tab provided to one surface thereof;

one or more second electrodes, each having a second tab provided to one surface thereof, the second electrodes being alternately stacked with the first electrodes; and a separator interposed between the first and second electrodes and folded a plurality of times so that at least two folds of the separator are interposed between adjacent first and second electrodes, the separator having one or more tab through-holes through which the first or second tabs protrude at folded portions of the separator.

2. The electrode assembly according to claim 1, wherein the first electrode further comprises a positive electrode collecting plate and a positive electrode active material layer.

3. The electrode assembly according to claim 1, wherein the second electrode further comprises a negative electrode collecting plate and a negative electrode active material layer.

4. The electrode assembly according to claim 1, wherein the separator surrounds a portion of the first and second tabs and upper and lower surfaces of the first and second electrodes.

5. The electrode assembly according to claim 1, wherein the tab through-holes are arranged alternately along a horizontal direction of the separator.

6. The electrode assembly according to claim 1, wherein the first and second tabs extend, respectively, to an exterior of the separator through the tab through-holes.

7. The electrode assembly according to claim 6, wherein the first and second tabs extended to the exterior are spaced apart from each other in a horizontal direction.

8. The electrode assembly according to claim 1, wherein the tab through-holes are elliptical in shape.

9. The electrode assembly according to claim 8, wherein the tab through-holes are formed using a thermal fusion method.

10. The electrode assembly according to claim 8, wherein a length of the tab through-holes is longer by about 1.0 to 2.0 mm than a width of each of the first and second tabs.

11. The electrode assembly according to claim 1, wherein the separator is selected from the group consisting of at least one of polyethylene, polypropylene and polyvinylidene fluoride.

12. The electrode assembly according to claim 1, wherein the separator is folded at an interval longer by about 4.0 mm than a longitudinal length of the second electrode.

13. A secondary battery comprising:
the electrode assembly according to claim 1; and
an outer casing having the electrode assembly built therein.

14. The secondary battery according to claim 13, wherein the outer casing includes a pouch type or can type outer casing.

15. The secondary battery according to claim 14, wherein the pouch type outer casing is made of a laminate sheet including a metal layer and a resin layer.

16. The secondary battery according to claim 14, wherein the pouch type outer casing further comprises a sealing portion.

17. The secondary battery according to claim 16, wherein the sealing portion is formed along an outer circumferential surface of the pouch type outer casing, and the pouch type outer casing is sealed by thermally fusing the sealing portion.

* * * * *